United States Patent [19]

Smith et al.

[11] 4,319,671
[45] Mar. 16, 1982

[54] HYDRO-PNEUMATIC BRAKE ACTUATOR ARRANGED TO MAINTAIN A CONSTANT BRAKE SHOE CLEARANCE

[75] Inventors: Eric G. Smith, Burlington; David A. Porteous, Grimsby, both of Canada

[73] Assignee: WABCO, Ltd., Hamilton, Canada

[21] Appl. No.: 155,343

[22] Filed: Jun. 2, 1980

[51] Int. Cl.³ .................................................. F16D 65/72
[52] U.S. Cl. ................................. 188/196 A; 60/590; 188/153 R
[58] Field of Search .................. 188/153 R, 196 A; 60/543, 590, 592

[56] References Cited

U.S. PATENT DOCUMENTS

| | | | |
|---|---|---|---|
| 3,837,443 | 9/1974 | Clemmons et al. | 188/196 A |
| 3,913,328 | 10/1975 | Shaffer | 188/153 R X |
| 4,068,746 | 1/1978 | Munechika | 188/196 A |

*Primary Examiner*—Duane A. Reger
*Attorney, Agent, or Firm*—G. J. Falce

[57] ABSTRACT

A hydro-pneumatic brake actuator arranged with a slack adjuster piston and one-way check valve device in the hydraulic path between a hydro-pneumatic actuator and a power piston, to which a friction brake element is connected for engagement with a vehicle wheel tread or brake disc during a brake application. During a brake release, the one-way check valve closes a passage through the slack adjuster piston to cause the piston to shift from its one extreme position to the other extreme position with the fluid flow, as the hydro-pneumatic actuator is moved from its application position to its release position. This in turn draws hydraulic fluid from the power piston chamber into a clearance volume created by shifting of the slack adjuster piston, and accordingly forces the power piston to retract a predetermined distance corresponding to the capacity of the clearance volume and the effective area of the power piston, thereby maintaining a constant brake shoe clearance during brake release.

10 Claims, 1 Drawing Figure

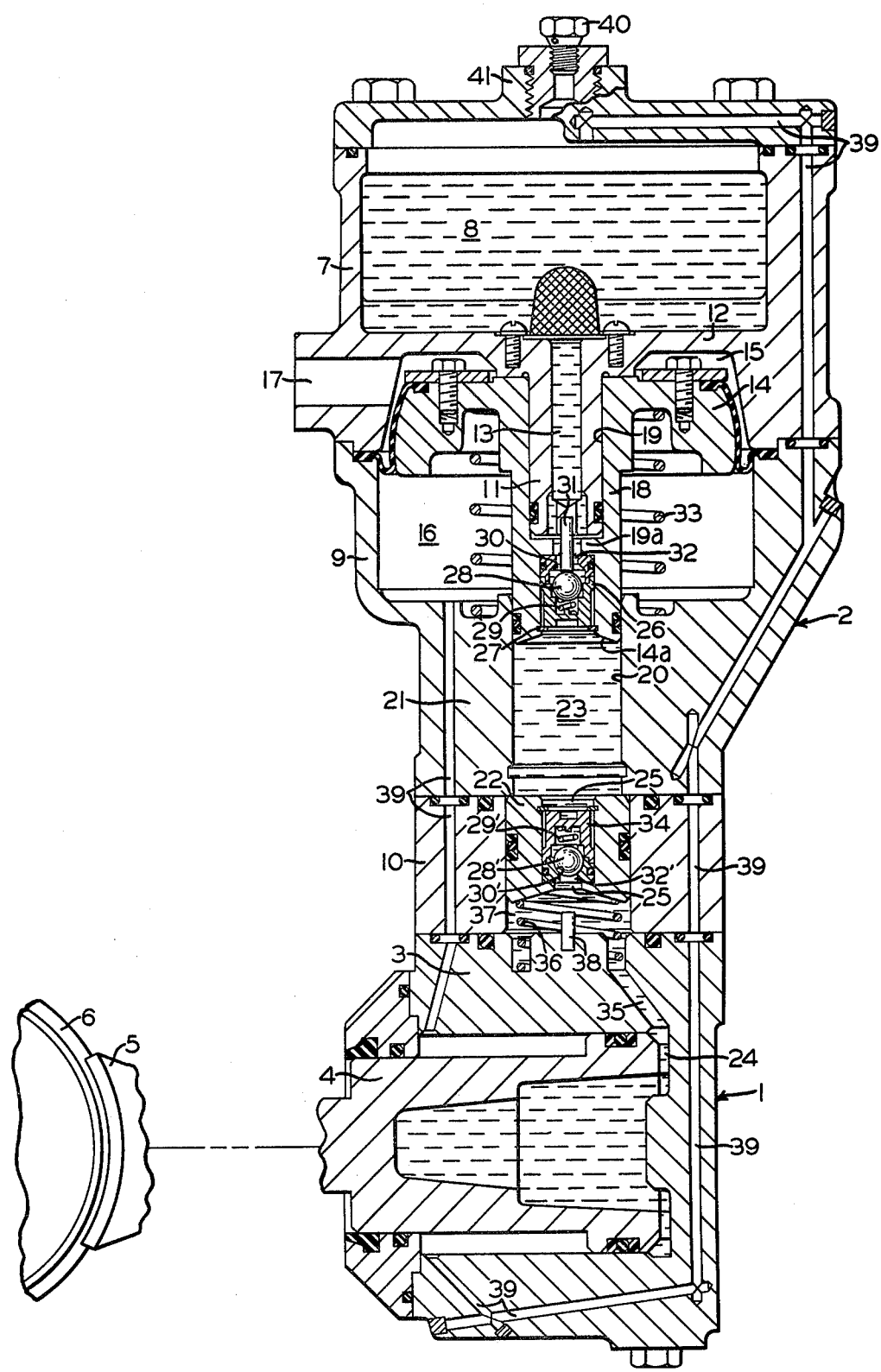

HYDRO-PNEUMATIC BRAKE ACTUATOR ARRANGED TO MAINTAIN A CONSTANT BRAKE SHOE CLEARANCE

BACKGROUND OF THE INVENTION

The present invention relates to hydro-pneumatic actuators and particularly to such actuators employed with brake apparatus for railway vehicles. This brake apparatus may be either tread brake units or disc brake units, for example.

Typically, these brake units employ a light spring to maintain constant brake shoe engagement with a wheel or brake disc, in order to generate, by friction, sufficient heat to prevent the accumulation of ice and snow on these brake parts during winter time. In addition, brake unit designs with "zero" clearance are simple in construction and accordingly offer the advantage of relatively low cost construction. Due to the many brake units employed on a train, however, this so-called "zero" clearance arrangement requires a considerable expenditure of train power during brake release, in order to overcome the continuous drag of the brake shoes. With today's high cost of fuel, any cost savings realized during manufacture is more than absorbed by the cost of the extra fuel consumed.

SUMMARY OF THE INVENTION

The object of the present invention, therefore, is to provide a hydro-pneumatic actuator device for railway brake apparatus having a simple arrangement by which a constant brake shoe clearance is maintained.

Briefly, this objective is attained by the addition of a single-acting hydraulic slack adjusted portion in the hydraulic path between a hydraulic input piston and a hydraulic power piston. The slack adjuster portion comprises a slack adjuster piston that operates through a clearance chamber during brake application. The slack adjuster piston is provided with a through passage containing a one-way check valve that is unseated by a pin in the full stroke position of the slack adjuster piston during a brake application to allow the buildup of hydraulic forces after the brake shoes have taken up the clearance to be maintained. This clearance is determined by the relative volume of the clearance chamber and the area of the power piston. During a subsequent brake release, a spring retracts the slack adjuster piston, and the one-way check valve closes with the initial return movement of the adjuster piston, so as to draw hydraulic fluid from the face of the power piston into the clearance chamber. This, in turn, draws the power piston toward release position a distance that establishes the desired brake shoe clearance.

BRIEF DESCRIPTION OF THE DRAWINGs

The single FIGURE drawing is an elevational view, in section, showing a hydro-pneumatic, truck mounted brake unit for a railway vehicle embodying the invention hereinafter described in greater detail.

DESCRIPTION AND OPERATION

The brake unit embodying the present invention comprises a force actuator portion 1 and a hydro-pneumatic converter portion 2. The force actuator portion 1 includes a cylinder 3 having a power piston 4 coaxially disposed therein for operation between a retracted position, as shown, and an applied position. In the retracted position of power piston 4, a brake shoe 5 suitably mounted in a conventional manner to power piston 4, is spaced-apart from the tread of a wheel 6 of a railway vehicle on which the brake unit may be mounted. This clearance between wheel 6 and brake shoe 5 is maintained constant over the wear life of the shoe and wheel, in accordance with the teachings of the present invention.

The hydro-pneumatic converter portion 2 is mounted to the force actuator portion 1 in a vertical disposition relative thereto. Converter portion 2 includes an upper casing section 7 in which is formed a hydraulic reservoir 8, an intermediate casing section 9, and a lower casing section 10. Upper section 7 also has an internally coaxially disposed piston guide stem 11 extending downwardly toward casing section 9 from the bottom side of a separating wall 12 forming the bottom of reservoir 8. A coaxial passage 13 is formed in guide stem 11 that extends therethrough so as to open into reservoir 8.

A hydro-pneumatic converter comprising a pneumatic control piston 14 and a hydraulic input piston 14a is coaxially vertically operable in the converter portion 2. Pneumatic control piston 14 is the diaphragm type, the outer periphery of the diaphragm being sealingly clamped between the two casing sections 7 and 9. Pneumatic control piston 14, in cooperation with that portion of upper casing section 7 below separating wall 12, forms a pneumatic pressure control chamber 15 adjacent the upperside of the control piston. Formed below control piston 14 within lower casing section 9 is a spring chamber 16. Pneumatic pressure chamber 15 is connectable via a port 17 to a source of control pneumatic pressure. Spring chamber 15 is vented to atmosphere via a fluid leakage recycling passage 39, that leads back to hydraulic reservoir 8, and ported plug 40 of a fluid refill cap 41.

Projecting from the underside of piston 14 is a coaxial guide stem 18, the face of which forms hydraulic input piston 14a. Guide stem 18 is formed with a bore 19 extending therethrough with a reduced diameter section 19a at approximately the axial midpoint of the bore to divide it into upper and lower portions. The upper portion of piston bore 19 is sealingly guided on piston guide portion 11 of casing section 12, which is telescopically disposed in the upper portion of bore 19, during axial movement of control piston 14, while the lower portion of guide stem 18 forming hydraulic input piston 14a is also telescopically sealingly disposed in a cylinder bore 20 formed in a reduced diameter lower portion 21 of intermediate casing section 9. Bore 20, along with hydraulic input piston 14a and an adjacent slack adjuster piston 22 is lower casing section 10 define a hydraulic pressure chamber 23 into which the lower end of bore 19 of guide stem 18 opens, and which chamber 23 is connected to a pressure side 24 of power delivery piston 4 via a through passage 25 in slack adjuster piston 22 and a passage 35 in cylinder 3.

Disposed in the lower portion of bore 19 of guide stem 18 is a cartridge-type check valve device 26 that is held in position against reduced diameter section 20 by a retainer ring 27. The check valve device comprises a ball valve 28 that is biased by a light spring 29 toward engagement with a tapered, annular seat 30. A spacer pin 31 integral with the bottom of guide porton 11 projects through the reduced diameter section 20 of bore 19 and an opening 32 in the top of the check valve cartridge 26 to engage and unseat ball valve 28 when control piston 14 is fully retracted by a release spring 33 in chamber 16.

Another cartridge-type check valve device 34 is disposed in a through passage 25 formed in slack adjuster piston 22. Being identical to cartridge check valve device 26, no further description of cartridge check valve device 34 is believed necessary except to point out that like ports are identified by a corresponding reference numeral distinguished by a prime mark. A return spring 36 is disposed in a clearance chamber 37, under slack adjuster piston 22 to bias piston 22 to its retracted position against a stop formed by the bottom of lower portion 21 of intermediate casing section 9. The volume of clearance chamber 37 is selected, as hereinafter explained, to establish the desired clearance between the brake shoe and wheel tread during brake release. A pin 38 integral with the casing forming cylinder 3 projects into the spring chamber under slack adjuster piston 22 to engage and unseat ball valve 28' when piston 22 is in its lowermost position.

When a brake application is initiated, pneumatic chamber 15 is supplied with pneumatic control fluid at a pressure commensurate with the degree of brake force desired, the manner in which this control fluid pressure is supplied being conventional and well-known, but not deemed necessary for an understanding of the invention. With the face of pneumatic control piston 14 subjected to this control pressure supplied to chamber 15, the hydro-pneumatic actuator is moved downwardly, as viewed in the drawing, against the opposing force of spring 33. Cartridge 26 is carried with the actuator, moving ball valve 28 thereof away from engagement with spacer pin 31. This allows the ball valve to be forced into engagement with its seat 30 by spring 29, thereby interrupting fluid pressure communication between hydraulic reservoir 8 and hydraulic chamber 23 via passage 13. With ball valve 28 thus closed, the force of pneumatic pressure acting on the upperside of control piston 14 is transmitted via hydraulic input piston 14a to the hydraulic fluid trapped in chamber 23 and thereby converted to a hydraulic force. Because the effective area of the upper side of control piston 14 in chamber 15 is much greater relative to the effective area of hydraulic input piston 14a, the force transmitted to the hydraulic fluid in chamber 23, and thus to power piston 4, is amplified according to the relative areas of the respective pistons.

As this hydraulic force transmission occurs, slack adjuster piston 22 is shifted downward, with its ball valve 28' remaining seated. As slack adjuster piston 22 moves to its downward-most position, power piston 4 is actuated to take up the clearance between brake shoe 5 and the tread of wheel 6. In the lowermost position of slack adjuster piston 22, ball valve 28' is brought into engagement with pin 38 and is, accordingly, unseated. At this point, it should be noted that the volume of hydraulic fluid in clearance chamber 37 is selected in accordance with the area of piston 4 and volume of chamber 24, so that when slack adjuster piston 22 bottoms out, the amount of fluid transmitted to chamber 24 will have actuated power piston 4 sufficiently to take up the brake shoe clearance and assure brake shoe/wheel tread engagement.

With piston 22 in its lowermost position and ball valve 28' consequently unseated, hydraulic fluid continues to be transmitted to piston 4, without further movement of piston 22, to accommodate increasing buildup of hydraulic brake pressure and/or brake shoe wear.

During a subsequent brake release, as dictated by the venting of fluid pressure from control chamber 15, return spring 33 is rendered effective to force the hydropneumatic actuator toward its release position. As this movement takes place, a low pressure area is established at the face of hydraulic input piston 14a, so that the piston movement draws hydraulic fluid with it and, in turn, creates a low pressure area across the upper face of slack adjuster piston 22. Due to the narrow passage through the cartridge check valve 34, the hydraulic fluid capable of being drawn past unseated ball valve 28', is insufficient to overcome the low pressure area created at the upper face of piston 22, and consequently piston 22 is shifted upwardly by its spring 36 to move ball valve 28' away from engagement with pin 38 and into engagement with its seat 30'. This completely terminates flow of hydraulic fluid past cartridge check valve 34 in piston 22, thus assuring continued movement of piston 22 toward its uppermost position, in concert with movement of the hydro-pneumatic actuator toward its uppermost position. This upward movement of slack adjuster piston 22 in turn creates a low pressure area on the underside thereof, so that hydraulic fluid in chamber 24 is drawn into clearance chamber 37, and accordingly power piston 4 is shifted toward its release position. The distance power piston 4 is retracted is dictated by the effective area of the piston and the maximum capacity of clearance chamber 37 to which fluid is displaced as the piston 22 is moved to its uppermost position, thereby establishing a predetermined clearance between brake shoe 5 and wheel tread 6 during brake release.

At substantially the same time as slack adjuster piston 22 reaches its uppermost position, input piston 14 will have been retracted by its spring 33 sufficiently to bring ball valve 28 into engagement with spacer pin 31 to unseat the ball valve and accordingly reestablish fluid flow communication therepast between hydraulic reservoir 8 and chamber 23. Consequently, hydraulic fluid is free to flow to chamber 23 from the reservoir to provide make-up fluid to fill any additional volume in chamber 23 that arises due to brake shoe-wheel wear and/or leakage increasing the stroke of control piston 14, without affecting the clearance established between brake shoe 5 and wheel tread 6.

Having thus described the invention, what we claim as new and desire to secure by Letters Patent, is:

1. A hydro-pneumatic actuator comprising:
   (a) a power actuator portion including:
      (i) a bore formed in the casing of said actuator portion; and
      (ii) a power piston coaxially disposed in said bore and cooperating therewith to form a first hydraulic chamber to which the supply of fluid pressure effects actuation of said power piston;
   (b) a converter portion including:
      (i) a casing having formed therein a second hydraulic chamber connected to said first hydraulic chamber, a reservoir in which hydraulic fluid is stored, and a pneumatic control chamber;
      (ii) a control piston operatively disposed in said control chamber for actuation from a release position to an application position in response to the supply of pneumatic pressure thereto;
      (iii) a spring acting on said control piston to urge movement thereof toward said release position;
      (iv) an input piston integral with said control piston and operatively disposed in said second hydraulic chamber, to which the fluid in said reservoir is connected, to transmit fluid pressure from said second hydraulic chamber to said first hydraulic chamber in consequence to movement of said control piston from said release position toward said application position, thereby effecting said actuation of said power piston; and (c) slack adjuster means for displacing a predetermined volume of hydraulic fluid from said first hydraulic chamber in response to movement of said control piston toward said release position, so as to effect retraction of said power piston a predetermined distance following actuation thereof, irrespective of the stroke traversed by said control piston between said release and application positions.

2. For use on a vehicle having a braking surface, a hydro-pneumatic brake actuator comprising:
   (a) friction means for engagement with said braking surface;
   (b) a power actuator portion including:
      (i) a bore formed in the casing of said actuator portion; and
      (ii) a power piston coaxially disposed in said bore and cooperating therewith to form a first hydraulic chamber, said power piston being arranged to force said friction means toward brake engagement with said braking surface when actuated in response to the supply of fluid pressure to said first hydraulic chamber;
   (c) a converter portion including:
      (i) a casing having formed therein a second hydraulic chamber connected to said first hydraulic chamber, a reservoir in which hydraulic fluid is stored, and a pneumatic control chamber;
      (ii) a hydro-pneumatic converter including:
         (1) a control piston operatively disposed in said control chamber for actuation from a release position to an application position in response to the supply of pneumatic pressure thereto;
         (2) a spring acting on said control piston to urge movement thereof toward said release position;
         (3) an input piston integral with said control piston and operatively disposed in said second hydraulic chamber, to which the fluid in said reservoir is connected, to transmit fluid pressure from said second hydraulic chamber to said first hydraulic chamber in consequence to movement of said control piston from said release position toward said application position, thereby effecting said brake engagement of said brake means with said friction surface; and
   (d) slack adjuster means for displacing a predetermined volume of hydraulic fluid from said first hydraulic chamber in response to movement of said control piston toward said release position, so as to effect retraction of said power piston a predetermined distance following actuation thereof, and accordingly establish a predetermined clearance between said friction means and said braking surface, irrespective of the stroke traversed by said control piston between said release and application positions.

3. A hydro-pneumatic actuator, as recited in claim 1 or 2, further comprising first one-way check valve means for connecting said fluid from said hydraulic reservoir to said second hydraulic chamber, when said stroke of said control piston exceeds a predetermined amount during movement of said control piston from said applied position to said release position, and for interrupting said connection during movement of said control piston from said release position to said application position.

4. A hydro-pneumatic actuator, as recited in claim 3, wherein said slack adjuster means comprises:
   (a) a slack adjuster piston operatively disposed in said second hydraulic chamber for movement between a first position and a second position;
   (b) a clearance volume formed in said second chamber on the side of said slack adjuster piston adjacent said first chamber;
   (c) a spring in said clearance volume acting on said slack adjuster piston to urge movement thereof toward said first position, wherein the capacity of said clearance volume is maximum;
   (d) a passage extending axially through said slack adjuster piston via which fluid pressure communication is established between said second chamber and said first chamber;
   (e) second one-way check valve means in said passage for interrupting said communication therethrough during movement of said slack adjuster piston from said second position to said first position in response to movement of said control piston toward said release position, to thereby effect said displacement of hydraulic fluid from said first hydraulic chamber.

5. A hydro-pneumatic actuator, as recited in claim 4, further characterized in that said displacement of said hydraulic fluid from said first chamber occurs by displacement therefrom to said clearance volume during said movement of said slack adjuster piston from said second position to said first position.

6. A hydro-pneumatic actuator, as recited in claim 1 or 2, wherein the effective area of said control piston subject to the pneumatic pressure supplied to said control chamber is greater than the effective area of said input piston subject to the hydraulic fluid in said second chamber.

7. A hydro-pneumatic actuator, as recited in claim 3 further characterized in that:
   (a) said casing of said converter portion is formed with a projection extending into said control chamber, said projection having a through passage, one end of which opens into said reservoir; and
   (b) a through bore in said integral control and input pistons, said bore sealingly surrounding said projection at one end and opening into said second chamber at the other end, said fluid connection between said reservoir and said second chamber being provided via said passage and said bore; and
   (c) said first one-way check valve means being carried in said bore between the other end of said passage and said other end of said bore.

8. A hydro-pneumatic actuator, as recited in claim 7, wherein said first one-way check valve means comprises:
   (a) a valve seat formed in a member carried in said bore;
   (b) a valve element normally engageable with said valve seat to effect said interruption of said fluid connection; and
   (c) means engageable with said valve element in said release position of said control piston for unseating said valve element and thereby establishing said fluid connection.

9. A hydro-pneumatic actuator, as recited in claim 4, wherein said second one-way check valve means comprises:
(a) a valve formed in a member carried in said passage;
(b) a valve element normally engageable with said valve seat to interrupt said fluid pressure communication between said second chamber and said clearance volume; and
(c) means engageable with said valve element in said release position of said control piston for unseating said valve element and thereby establishing said communication between said second chamber and said clearance volume.

10. A hydro-pneumatic actuator, as recited in claim 1 or 2, further characterized in that said predetermined distance is determined in accordance with said maximum capacity of said clearance volume and the effective area of said power piston subject to hydraulic fluid of said first chamber.

* * * * *